No. 683,225. Patented Sept. 24, 1901.
D. J. ROSEN.
VENTILATOR.
(Application filed May 1, 1901.)
(No Model.) 2 Sheets—Sheet 1.
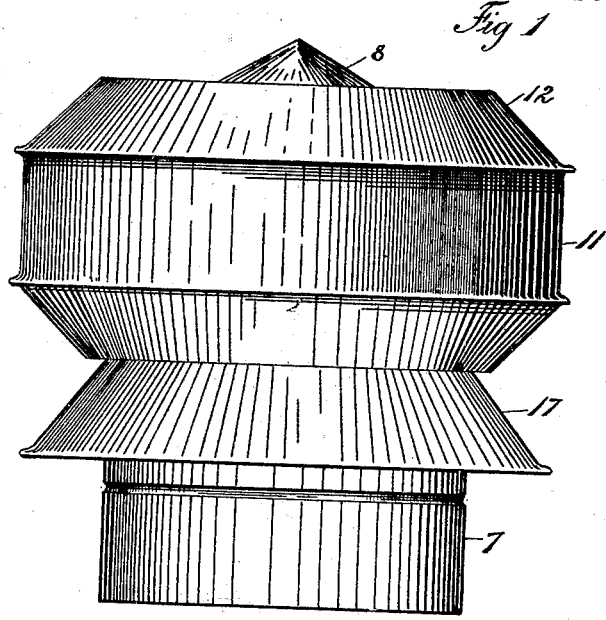
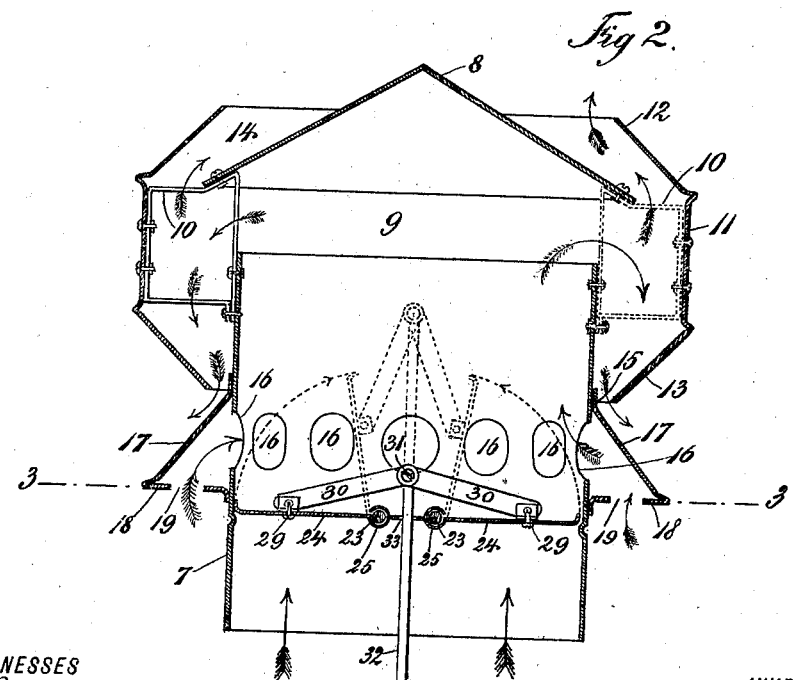
WITNESSES
INVENTOR
BY
ATTORNEYS
THE NORRIS PETERS CO., PHOTO-LITHO., WASHINGTON, D. C.

No. 683,225. Patented Sept. 24, 1901.
D. J. ROSEN.
VENTILATOR.
(Application filed May 1, 1901.)
(No Model.) 2 Sheets—Sheet 2.
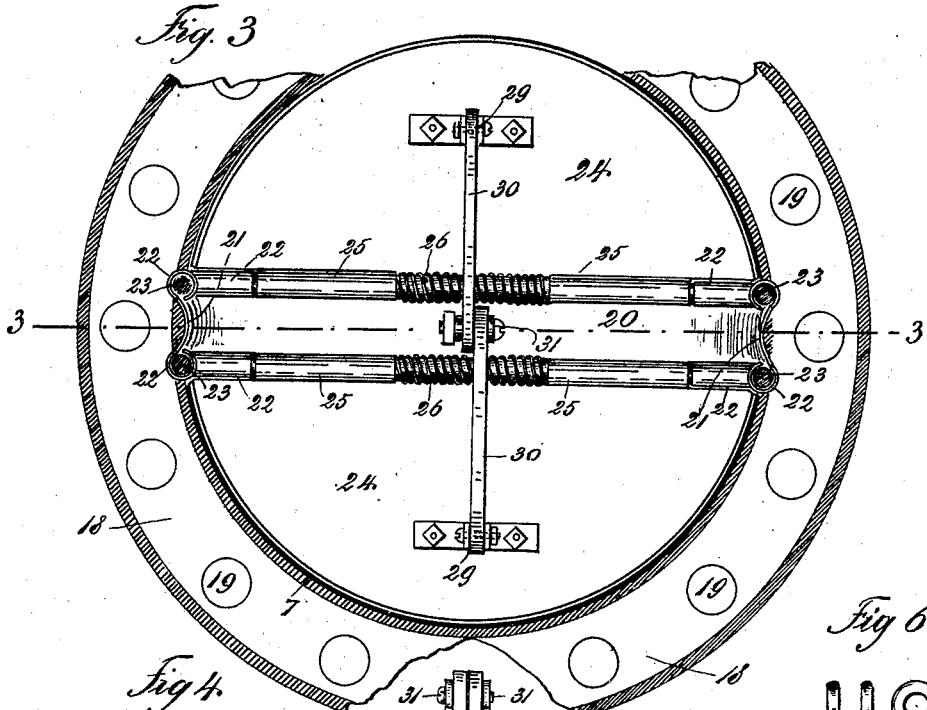
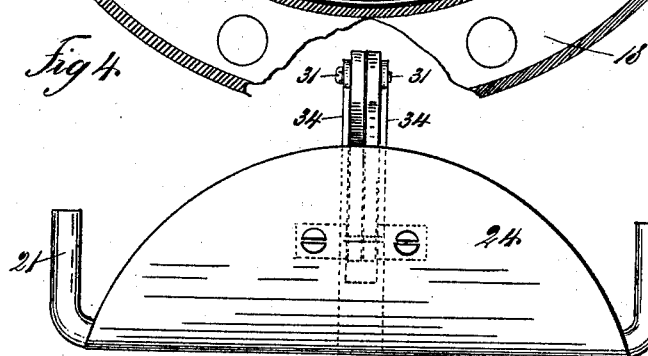
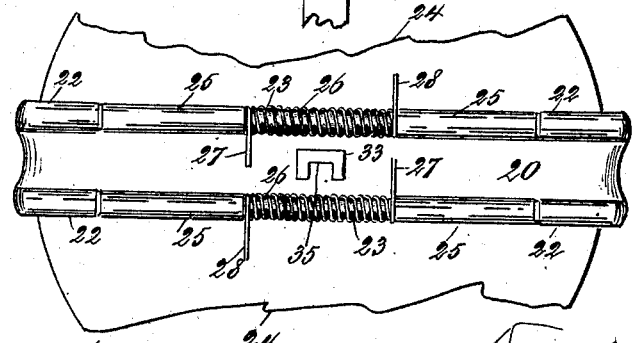
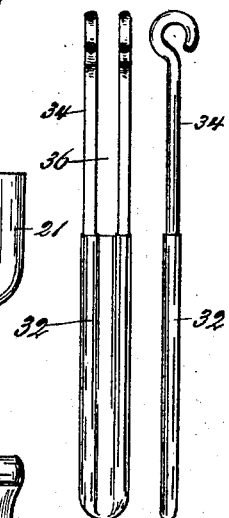
WITNESSES
INVENTOR
David J. Rosen
BY Edgar Tate & Co
ATTORNEYS

UNITED STATES PATENT OFFICE.

DAVID J. ROSEN, OF BROOKLYN, NEW YORK.

VENTILATOR.

SPECIFICATION forming part of Letters Patent No. 683,225, dated September 24, 1901.

Application filed May 1, 1901. Serial No. 58,292. (No model.)

*To all whom it may concern:*

Be it known that I, DAVID J. ROSEN, a citizen of the United States, residing at Brooklyn, in the county of Kings and State of New York, have invented certain new and useful Improvements in Ventilators, of which the following is a full and complete specification, such as will enable those skilled in the art to which it appertains to make and use the same.

This invention relates to ventilators, and particularly to that class of ventilators which are known as "roof-ventilators" and which are designed for use in ventilating houses, halls, and other buildings; and the object thereof is to provide an improved device of this class which is simple in construction and operation and which is so constructed as to prevent back draft and which is provided with suitable dampers whereby the same may be opened or closed as desired; and with this and other objects in view the invention consists of a ventilator constructed as hereinafter described and claimed.

The invention is fully disclosed in the following specification, of which the accompanying drawings form a part, in which the separate parts of my improvement are designated by the same reference characters in each of the views, and in which—

Figure 1 is a side elevation of my improved ventilator; Fig. 2, a central vertical section thereof; Fig. 3, a horizontal section on the line 3 3 of Fig. 2; Fig. 4, a side view of the damper mechanism when the dampers are opened; Fig. 5, a bottom plan view of the damper mechanism, showing the dampers in the closed position; and Fig. 6, a side and edge view of a device which I employ for closing the dampers.

In the practice of my invention I provide a ventilator which is of the general form shown in Figs. 1 and 2 and the body portion of which comprises a tubular casing 7, over which is placed a conical cover 8, which is separated from the tubular casing 7 by a space 9, and said cover 8 is supported by brackets 10, which are secured thereto and to the tubular casing 7, and one of which is shown in full lines and another in dotted lines in Fig. 2. The brackets 10, which extend outwardly from the tubular casing 7, also support an annular shield or guard 11, which is provided at the top thereof with an upwardly and inwardly directed flange or rim 12 and at the bottom thereof with a similar downwardly and inwardly directed flange or rim 13, and between the conical top 8 and the flange or rim 12 is a space 14, and between the flange or rim 13 at the bottom of the guard 11 and the casing 7 is another annular space 15. The tubular casing 7 is provided centrally of its length with an annular row of openings 16, any desired number of which may be employed, and secured to the outer side of said casing above said openings 16 is a downwardly and outwardly directed shield or guard 17, which extends below the openings 16, and at the bottom of which is an annular plate 18, provided with openings 19.

Secured transversely of the casing 7 and below the opening 16 is a support 20, which is preferably composed of sheet metal and is folded upwardly at the ends, as shown at 21, and the ends of which are preferably provided at the opposite corners with tubes 22, formed by folding the edges of the sheet-metal plate 20, and these tubes are L-shaped in form, and placed therein are rods 23, which also extend transversely across the casing 7 and form a part of the support 20 and give strength and rigidity thereto, and hinged to the horizontal portion of the rods 23 are dampers 24, which also preferably consist of sheet metal and the inner edges of which are provided with tubular members 25, through which the rods 23 pass, so as to form a hinge, and between the tubular hinged members 25 at each side of the support 20 are placed spiral springs 26, through which the rods 23 pass, and the opposite ends of these springs bear on the under side of the support 20, as shown at 27, and on the under side of the dampers 24, as shown at 28 in Fig. 5, and said springs serve to force the dampers upwardly or open the same, as indicated in Fig. 4 and in dotted lines in Fig. 2.

Pivotally connected with the upper side of each of the dampers 24 and centrally thereof, as shown at 29, are toggle-levers 30, the free ends of which are pivotally connected, as shown at 31, and loosely suspended from the pivotal support 31 of the toggle-levers 30 is an operating-bar 32, which passes downwardly through an opening 33 in the support 20, and the bar 32, which may be made in any desired manner and of any preferred material, is provided at one end with arms 34, by means of which the pivotal connection at 31 is made, and the opening 33 in the support 20 is provided at one side with a lug or projection 35, adapted to enter between the arms 34 of the operating-bar 32. The normal position of the dampers 24 is that shown in dotted lines in Fig. 2, and whenever it is desired to close said dampers the bar 32 is pulled downwardly until the lug or projection 35 passes between the arms 34, when said bar is released, and the lug or projection 35, striking against the upper end of the bar 32, prevents the opening of the damper, and the slot 36, between the arms 34 of the bar 32, forms an opening to receive the lug or projection 35. Whenever it is desired to open the damper, the bar 32 is swung to one side, so as to disengage the lug or projection 35, and the springs 26 operate to raise or open the damper into the position shown in dotted lines in Fig. 2.

One of the chief features of this invention consists in the guard or shield 17 and the openings 16 in the casing 7, which constitute a side draft which operates to compel a proper action of the ventilator at all times and to prevent any back draft therethrough. The shield or guard 11 also aids in producing this result, as the wind cannot enter the casing 7 above the top thereof, the action of the wind serving to draw the air up through said casing, the currents of the air passing through the ventilator being clearly indicated by the arrows in Fig. 2.

This ventilator is simple in construction and operation and perfectly adapted to accomplish the result for which it is intended, and changes in and modifications of the construction described may be made without departing from the spirit of my invention or sacrificing its advantages.

Having fully described my invention, what I claim as new, and desire to secure by Letters Patent, is—

1. A ventilator comprising a casing open at the bottom and provided with a cover between which and the casing is an air port or passage, an annular shield or guard supported around said port or passage at a distance from the casing and the cover, and provided both at the top and bottom with inwardly-directed flanges or rims, said casing being also provided with annularly-arranged air ports or passages and with a downwardly and outwardly directed shield or guard above the same, and a transverse support secured in said casing below said air ports or passages and dampers hinged to said support and adapted to close the passage through said casing, and means for opening and closing said dampers, substantially as shown and described.

2. A ventilator comprising a casing open at the bottom and provided with a cover between which and the casing is an air port or passage, an annular guard or shield inclosing said port or passage, air ports or passages formed in the side walls of said casing, a downwardly and outwardly directed shield or guard inclosing said air ports or passages, and dampers mounted in said casing and adapted to close the passage therethrough, substantially as shown and described.

3. A ventilator comprising a casing open at the bottom and having an air port or passage at the top, and a shield or guard inclosing the same, said casing being also provided with air ports or passages and with a downwardly and outwardly directed shield or guard inclosing the same, substantially as shown and described.

4. A ventilator comprising a casing open at the bottom and provided with a conical top which is supported thereover, and between which and the casing is an air port or passage, an annular shield inclosing said air port or passage and provided at the top with an upwardly and inwardly directed flange, and at the bottom with a downwardly and inwardly directed flange, said casing being also provided with annularly-arranged ports or passages and with a downwardly and outwardly directed shield or guard inclosing the same, substantially as shown and described.

5. A ventilator comprising a casing open at the bottom and provided with a conical top which is supported thereover, and between which and the casing is an air port or passage, an annular shield inclosing said air port or passage and provided at the top with an upwardly and inwardly directed flange, and at the bottom with a downwardly and inwardly directed flange, said casing being also provided with annularly-arranged ports or passages and with a downwardly and outwardly directed shield or guard inclosing the same, and dampers mounted within said casing and adapted to close the passage therethrough, substantially as shown and described.

6. A ventilator of the class described, comprising a casing open at the bottom and top and provided with side ports or passages, a support mounted transversely in said casing below said side ports or passages, dampers hinged to said support, springs for holding said dampers normally open and devices for closing said dampers, substantially as shown and described.

In testimony that I claim the foregoing as my invention I have signed my name, in presence of the subscribing witnesses, this 25th day of April, 1901.

DAVID J. ROSEN.

Witnesses:
F. A. STEWART,
L. R. BAYER.